United States Patent [19]

Klesse et al.

[11] Patent Number: 4,847,309

[45] Date of Patent: Jul. 11, 1989

[54] METHOD FOR MAKING FOUNDRY SAND CONTAINING A RESIN BINDER

[75] Inventors: Wolfgang Klesse, Mainz; Heinz-Jochen Auer, Gross-Gerau; Peter Quis, Darmstadt, all of Fed. Rep. of Germany

[73] Assignee: Röhm GmbH, Darmstadt, Fed. Rep. of Germany

[21] Appl. No.: 171,179

[22] Filed: Mar. 18, 1988

Related U.S. Application Data

[63] Continuation of Ser. No. 78,240, Jul. 27, 1987, abandoned.

[30] Foreign Application Priority Data

Aug. 7, 1986 [DE] Fed. Rep. of Germany ....... 3626663

[51] Int. Cl.$^4$ .............................................. C08K 3/36
[52] U.S. Cl. .................................... 523/139; 524/548; 524/556
[58] Field of Search ................... 524/548, 556, 558; 523/139, 142, 141

[56] References Cited

U.S. PATENT DOCUMENTS

| | | | |
|---|---|---|---|
| 3,679,703 | 7/1972 | Conrady | 523/139 |
| 4,106,944 | 8/1978 | Epstein | 523/139 |
| 4,163,000 | 7/1979 | Kashima et al. | 524/446 |
| 4,183,759 | 1/1980 | Epstein | 523/139 |
| 4,278,581 | 7/1981 | Nakazawa | 523/139 |
| 4,585,809 | 4/1986 | Auer et al. | 523/139 |

FOREIGN PATENT DOCUMENTS

| | | |
|---|---|---|
| 3305361 | 8/1984 | Fed. Rep. of Germany . |
| 7736606 | 6/1978 | France . |
| 729057 | 5/1955 | United Kingdom . |
| 732005 | 6/1955 | United Kingdom . |

*Primary Examiner*—Lewis T. Jacobs
*Attorney, Agent, or Firm*—Curtis, Morris & Safford

[57] ABSTRACT

Methods for making foundry sand containing a binder by combining a dried powdered carboxylated polymer, partially in its salt form, with dry or wet foundry sand free of binder.

6 Claims, No Drawings

METHOD FOR MAKING FOUNDRY SAND CONTAINING A RESIN BINDER

This application is a continuation of application Ser. No. 078,240, filed July 27,1987, now abandoned.

The present invention relates to methods for making molding sands, and more particularly heat-curing foundry molding sands, by incorporating certain emulsion polymers therein.

The Prior Art

Foundry molding sands to which polymer binders have been added are used to make mold cores and molds for use in metal casting. As a rule, the molding sands are formulated with the binders, usually furan resins or phenolic resins, in such a way that the sand grains are coated with a thin film of binder. The sand formulations so prepared are then charged to an appropriate metal container such as a core box and fully cured, at temperatures between 150° C. and 300° C., within a short time which may range from 60 to 80 seconds, for example. After removal, the shaped parts, for example a mold core and shell, are hard, stable, and ready for use.

The polymeric binders are generally used in the form of solutions, less frequently as dispersions or emulsions. Since there are well founded ecological and economic objections to the use of organic solvents as vehicles for binders in foundry practice, U.S. Pat. No. 4,585,809 proposes binders comprising a synthetic resin containing carboxyl groups, used in the form of an aqueous dispersion of an appropriate polymer. The polymer is composed of (A) at least one monomer having at least one and not more than two carboxyl groups in the molecule, in amounts of not less than 20 and not more than 90 percent by weight of the polymer, and (B) monomers copolymerizable with (A), in amounts of from 10 to 80 percent by weight of the polymer, with the condition that the amount of carboxylated groups present in the resulting polymer in the salt form must not exceed 20 percent. The polymers may also contain up to about 30 percent by weight of nonradically crosslinking monomers.

OBJECT OF THE INVENTION

When aqueous emulsion polymers are to be used as binders for molding sands, as in U.S. Pat. No. 4,585,809, then care must be taken in preparing the molding sands to keep the amount of water introduced into the sand with the dispersion to a minimum in order that the flowability of the sand is impaired as little as possible. To satisfy this condition, the solids content of the binder dispersions is put as high as possible. However, experience has shown that it is extremely difficult to obtain high solids contents with emulsion polymers containing large amounts of hydrophilic monomers without considerable amounts of coagulate forming. This problem is encountered especially with emulsion polymers containing a high percentage of acrylic acid and esters carrying hydroxyl groups as comonomers present in addition to methacrylic acid.

The U. S. patent cited also contemplates an embodiment in which there is a subsequent partial neutralization of the carboxylic acid groups in the polymer up to the stated limit of 20 percent. However, this entails a still further dilution of the dispersion, with the result that the solids contents of the dispersions frequently are less than 30 percent by weight.

To be of practical interest, any solution to this problem would have to permit the water content to be reduced without the other properties of the polymeric binder being impaired. It is generally held that polymeric binders for heat curing foundry molding sands must meet the following requirements:

1. High dimensional accuracy of molds and cores.
2. Good resistance to erosion by molten metal.
3. A mold and core surface that is as smooth and as porefree as possible.
4. Hardness and handleability after removal, for example, while still warm.
5. Little need to clean the castings.
6. Ease of removal of the core sand after casting.
7. Reusability of the sand.
8. High curing rates and complete cure.
9. Usability in automated production.
10. Minimal evolution of noxious gases.

The Invention

It has now been found that the practical requirements on polymeric binders for molding sands are ideally met by dried, redispersible emulsion polymers which are redispersed in water for use. The spectrum of requirements includes a few particularly important aspects which should be borne in mind when the emulsion polymers are selected:

(a) The emulsion polymers must be satisfactorily redispersible, that is the particles must again form a dispersion when mixed with water.

(b) The dried redispersible emulsion polymers must exhibit good film forming properties.

(c) After film formation and removal of the water by drying, the polymers must have a high deflection temperature (heat distortion point).

Dried, and especially spray-dried, emulsion copolymers which are satisfactorily redispersible with water have proved particularly suitable for the purposes of the invention.

The present invention thus has as its object a method for making molding sands containing a binder by the use of polymeric binders, the binder being in the form of a dried, redispersible emulsion polymer comprising:

(A) from 15 to 90, and preferably from 20 to 60, and more particularly from 20 to 50, percent by weight of at least one unsaturated carboxylic acid of the formula

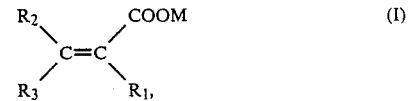

wherein $R_1$, $R_2$, and $R_3$ are hydrogen, an alkyl group having from 1 to 6 carbon atoms, or a $-(CH_2)_n-COOM$ group, M is a proton or, in the salt form, an alkali metal, alkaline earth metal, or ammonium cation, and n is 0 or 1, the unsaturated carboxylic acids of formula (I) having not more than two $-COOM$ groups in the molecule, and (B) from 10 to 85 percent by weight of further monomers that are copolymerizable with (A), subject to the condition that from 0.5 to 50, and preferably from 1 to 25, and more particularly from 2 to 20, percent of the monomers (A) shall be present in the salt form, M being an alkali metal, alkaline earth metal, or ammonium cation. According to the invention such a polymer is admixed as a powder with unwetted binder-free molding sand and uniformly dispersed therein. In accordance with the invention, the emulsion polymer is in the form of a dried, and more particularly of a spray dried, powder which is redispersible in water.

The criterion for redispersibility within the meaning of the invention is that after being mixed into water the dried powder redisperses into particles in the size range of latex particles. The state of redispersion of the particles so achieved will generally remain stable at least for a period of weeks, and usually for months; in other words, the redispersion can be handled much like the primary dispersion. For example, no significant clumping will occur. Dried powders which will disperse in water to the extent of at least 80 percent by weight are usable within the meaning of the present invention.

The dried powder usually consists of fine loosely aggregated particles. When the polymer is recovered from an emulsion polymer latex, care should be taken to preserve the latex particles intact so they do not fuse into inseparable aggregates. In isolating the polymer, it will be advisable to use temperatures which are at least 20° C. below the dynamic glass transition temperature $T_{\lambda max}$ of the polymers. $T_{\lambda max}$ may be determined in conformity with DIN 53445/DIN 7724.

Spray drying is particularly suitable for isolation of the solid product, but also precipitation and drying of the polymer by the methods commonly employed in this field, for example by the addition of alcohol or electrolytes or by freeze coagulation. (See Houben-Weyl, *Methoden der organischen Chemie*, 4th Ed., Part 1, Vol. 14/1, pp. 470 ff. with respect to precipitation, and Ullmann's *Enzyklopaedie der technischen Chemie*, 4th Ed., Vol. 2, pp. 707 ff. with regard to drying). Another suitable technique is freeze drying. Spray drying is generally understood to mean the breaking up of the liquid materials to be dried into fine, mistlike droplets and their drying, usually with a heated air stream. (See Ullmann's *Enzyklopaedie der technischen Chemie*, 4th Ed., Vol. 2, pp. 711-712; Verlag Chemie 1972). The atomizing devices employed are nozzles (one- or two-fluid nozzles) or disks which usually rotate at a speed of from 4,000 to 30,000 R.P.M (See Masters Ind. Eng. Chemistry 60 [1968], No. 10, pp. 53-63). The inlet air temperature advantageously ranges from 100° C. to 250° C., and the outlet temperature from 50° C. to 100° C., and preferably from 60° C. to 90° C. Dwell times are between 0.1 and 30 seconds and advantageously between 0.5 and 10 seconds. The crucial factor here is the redispersibility of the polymer. The latter may be redispersible even if fairly large aggregations appear to form on drying, especially in the case of polymers formulated to be rather soft.

Freeze drying (see Ullmann's op. cit., 4th Ed., Vol. 2, p. 716 ff.) is usually employed when the methods described above do not yield redispersible powders. This may occur under certain conditions with polymers at the lower limit of the range of suitable glass transition temperatures. The dried emulsion polymer generally is obtained in the form of a fine white powder; as a rule, however, its particles are not formed of individual latex particles but of loose aggregates of many latex particles. However, these can be broken up with the use of force. (When pressure is exerted on a powder particle with a needle, for example, and chips break off, this indicates that the latex particles are present in a glassy state and cannot be subdivided without the expenditure of energy). The average particle size will range from 10 to 500 microns, and more particularly from 30 to 150 microns.

The residual moisture content of the dried emulsion polymers is usually between 0.5 and 8 percent by weight, and more particularly between 0.2 and 5 percent by weight. A special advantage is the surprising fact that ready-to-use molding sands which are also storable can be produced from molding sand with which the polymeric binders have been admixed in the form of the dried emulsion polymers. These ready-to-use molding sands can be weighed, packaged, stored, shipped, and dosed without a water content, to be viewed as dead weight. Unconsumed quantities can be stored. The sensitivity to freezing which is a factor when polymer dispersions, for example, are used here is absent. For immediate use, as in the production of foundry mold cores, water is added to the molding sands containing the binders. Upon use, the ratio of dried polymer powder to water as a rule will be between 1 part by weight of polymer to 1 part of water and 1 part of polymer to 10 parts of water, and preferably between 1 part of polymer to 1.5 parts of water and 1 part of polymer to 5 parts of water. The amount of the binder, that is of the dried emulsion polymers, in the ready-to-use moldings sands ranges from 0.1 to 20 percent by weight, preferably from 0.5 to 5 percent, and most preferably from 1 to 3 percent.

Sand for use as a molding sand within the meaning of the present invention means the usual refractory, granular, base material consisting of washed and classified quartz sand, and in some cases also of chromite, zirconium, and olivine sands. In addition, grog, magnesite, sillimanite, or corundum materials are used. The grain diameter is generally in the range from 0.1 to 0.5 mm. (See Kirk-Othmer, *Encyclopedia of Chemical Technoloqy*, 3rd Ed., Vol. 6, pp. 212-213; John Wiley & Sons, 1979). In a preferred embodiment of the process, the sands being used should at most contain mechanically held moisture; in other words, their water content should be less than 0.5 weight percent.

As an alternative, it is, surprisingly, possible to add the dry emulsion polymer also to wetted sand. However, the water content of the molding sand should preferably not exceed 4.5 percent by weight.

Thus the invention contemplates the use of molding sands both in the dry state and with a water content of up to 4.5 percent by weight, preferably between 0.5 and 4.5 percent, and more particularly of 3.0 ±0.8 percent.

It is most surprising that the molding sands prepared in accordance with the invention meet the practical requirements set forth above since there was nothing to indicate that the method described would result in film formation, which is indispensable. Remarkably, when dry sands are used in their preparation, it will suffice for the immediate conditioning of the inventive molding sands of the invention, containing a powdered binder, to wet them uniformly.

THE EMULSION COPOLYMER

The starting material is an appropriate emulsion polymer, produced conventionally as a aqueous dispersion (see U.S. Pat. No. 4,585,809); that is to say, the polymer composition is based in every case on the dispersibility of the polymer in an aqueous phase. The polymer preferably has a minimum film forming temperature (MFT) in conformity with DIN 53787 of less than 100° C., and more particularly less than 80° C. Moreover, the polymer preferably has a dynamic glass transition temperature $T_{\lambda max}$ in conformity with DIN 53445/DIN 7724 greater than 100° C., and preferably above 130° C. Under certain conditions, the deflection temperature (heat distortion point) and the dynamic glass transition temperature $T_{\lambda max}$ of the polymers can be influenced in a predictable manner by proper selection of the monomers present therein and their amounts. (See Vieweg-Esser, *Kunststoff-Handbuch*, Vol. IX, Polymethacrylate, pp. 333–340; Carl Hanser Verlag, 1975).

Salt formation by the acid groups (M=H) is achieved by reaction thereof with bases. Suitable bases are alkali metals or alkaline earth metals, for example sodium hydroxide, potassium hydroxide, sodium carbonate, potassium carbonate, sodium bicarbonate, or calcium hydroxide, as well as ammonia and organic amines, and especially alkylamines having up to 6 carbon atoms in the alkyl group, and more particularly primary, secondary, and tertiary alkylamines and alkanolamines such as triethylamine, diethanolamine, or triethanolamine.

The presence of a limited fraction of the carboxyl group in formula (I) in salt form (M=Na$^+$, K$^+$, Ca$^{+2}$, Mg$^{+2}$, etc.) is of considerable importance with respect to the redispersibility of the emulsion polymer. What is crucial is not only the absolute amount of the monomers of formula (I) in salt form but also the percentage by weight in which they are present in the form of salts. (See above). When the amount of the monomeric units present in salt form is less than 0.5, and specifically less than 0.1, percent by weight of the total weight of the unneutralized emulsion copolymer, adequate redispersion is usually not achieved. If said amount exceeds 8, and specifically 10, percent by weight, the latex particles will either swell markedly or dissolve completely in water. In either case, technically satisfactory film formation cannot occur or, if it does, then the viscosity of the system will militate against its use. The amount of the monomers of formula (I) present in the form of salts is preferably limited to the amount required to achieve sufficiently stable redispersion. The amount which the monomers (A) represent of the emulsion polymer ranges from 15 to 90, and preferably from 20 to 60, and more particularly from 20 to 50, percent by weight of all the monomers. The $R_1$, $R_2$, and $R_3$ groups in formula (I), if they do not represent or contain —COOM groups, preferably are hydrogen or methyl.

Monomeric unsaturated carboxylic acids of formula (I) particularly include fumaric acid, itaconic acid, and especially acrylic acid and methacrylic acid. Advantageously, different representatives of type (A) monomers may be present in the copolymer.

The amount which the monomers (B) represent of the emulsion polymer ranges from 10 to 85, preferably from 40 to 80, and more particularly from 50 to 80 percent by weight of all the monomers.

By definition, the monomeric components (B) of the copolymers are monomers which are copolymerizable with (A), in other words, monomers capable of free-radical polymerization. They may be presented by the formula $$\underset{H_2C=C-R_5,}{\overset{R_4}{|}} \quad (II)$$

for example, wherein $R_4$ is hydrogen or methyl and $R_5$ is —COOR$_6$, —CONR$_7$R$_8$, phenyl or alkyl-substituted phenyl, —(CH$_2$)$_m$—O—R$_9$, —CH=CH$_2$, or an inert five- or six-membered heterocyclic group, $R_6$ in these formulas is alkyl having from 1 to 18 carbon atoms; $R_7$ and $R_8$, taken alone and independently of each other, are hydrogen or alkyl having from 1 to 18 carbon atoms, or taken together, optionally with inclusion of a further nitrogen or oxygen atom, form a five- or six-membered heterocyclic ring; $R_9$ is alkyl having 1 to 6 carbon atoms or is

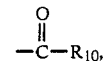

wherein $R_{10}$ is alkyl having from 1 to 5 carbon atoms, and m is 0 or 1.

"Alkyl-substituted" means preferably substituted with a $C_1$–$C_3$ alkyl group.

In accordance with a preferred embodiment of the invention, component (B) of the copolymer may include monomers which are capable of non-radically crosslinking at a temperature above 60° C. These monomers, which as such are susceptible of free-radical polymerization, generally contain a functional group which is capable of entering into a crosslinking reaction at a temperature above 60° C. with functional groups of other monomers or with a multifunctional (that is, at least bifunctional) crosslinking agent which itself is not susceptible of free-radical polymerization.

The temperature threshold of 60° C. is specified to prevent premature crosslinking. Obviously the crosslinking reaction should take place, in the range above 60° C., at a temperature at which ultimate shaping occurs, for example in the range above 100° C. and up to 300° C. The non-radically crosslinking monomers preferably represent from 0.3 to 30, and more particularly from 0.5 to 20 percent by weight of the polymer.

The components (B) of the copolymers thus fall into the following groups:

(a) Esters of acrylic and methacrylic acid with $C_1$–$C_{18}$ alcohols, and especially with $C_1$–$C_8$ alcohols. Illustrative of these are methyl methacrylate, methyl acrylate, ethyl acrylate, ethyl methacrylate, butyl acrylate, butyl methacrylate, and ethylhexyl acrylate.

(b) Acrylamide, methacrylamide, and corresponding amides which are $C_1$–$C_8$-alkyl-substituted on the nitrogen. Examples are methacrylamide and especially acrylamide.

(c) Monomers other than (a) and (b) which are capable of non-radically crosslinking at a temperature above 60° C. These monomers are preferably derivatives of acrylic or methacrylic acid.

(d) Styrene and alkylated styrenes, for example alpha-methylstyrene, as well as styrenes alkylated in the nucleus, such as para-methylstyrene.

(e) Vinyl ethers and vinyl esters, and particularly the methyl- to hexyl-vinyl ethers, as well as vinyl acetate, vinyl propionate, and vinyl butyrate.

(f) Heterocyclic vinyl compounds consistent with the "nitrogen-containing comonomers" disclosed in a different context in U.S. Pat. No. 3,067,163, incorporatd herein by reference, such as vinylpyridine, vinylpyrrolidone, vinylimidazole, and vinylcarbazole, especially the N-vinyl compounds.

(g) Butadiene.

With the exception of the non-radically crosslinking monomers and provided that the emulsion polymer has a dynamic glass transition temperature $T_{80\,max}$ of at least 100° C. and that the minimum film forming temperature is less than 100° C., the composition of component (B) obviously is not particularly critical so long as it corresponds to the definitions and characteristics set forth.

Component (B) is advantageously made up of several monomers. Particularly preferred are the derivatives of acrylic and methacrylic acid, and especially their esters and amides. First among these are methyl methacrylate and ethyl acrylate.

In a particularly preferred embodiment, the copolymer thus is formed of (A') acrylic acid and/or methacrylic acid in amounts from 20 to 60 percent by weight, and (B') esters of acrylic acid and/or methacrylic acid (a), or acrylamides and/or methacrylamides (b), or both, optionally together with heterocyclic vinyl compounds (e). The monomers (a) preferably represent more than 70 weight percent of component (B'). Particularly preferred is an embodiment in which the ratio between the components (A') and (B') is between about 1:1 and about 1:3.

The copolymerization of monomers of type (c) is also of particular interest. These monomers usually contain a functional group which is capable of non-radically crosslinking by reacting with another functional group or by reacting with a multifunctional non-radically crosslinking agent at temperatures above 60° C. Such monomers and crosslinking agents are known per se.

In addition to the carboxyl, amide, and ester groups which are necessarily present or are present as further components of the monomer group (B), illustrative of further functional groups which satisfy these conditions are the hydroxyl, epoxy, and N-methylolamide groups and ethers derived therefrom, and so-called masked or blocked isocyanate groups.

With this type of crosslinker, crosslinking generally occurs through a condensation reaction (e.g., by elimination of water, amine, alcohol, or formaldehyde) or through an addition reaction (e.g., by nucleophilic attack on an epoxy or masked isocyanate group).

Particularly preferred are crosslinking monomers of group (c) which correspond to the formula

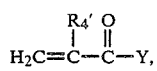  (III)

for example, wherein $R_4'$ is hydrogen or methyl, Y is

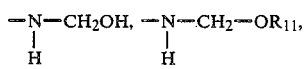

or Q-B-Z wherein Q is oxygen or $-NR_{12}$, B is a linear or branched hydrocarbon having from 1 to 8 carbon atoms, Z is hydroxyl or

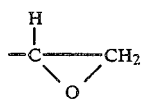

or $NHR_{13}$, wherein $R_{11}$ and $R_{13}$ are alkyl having from 1 to 8 carbon atoms and $R_{12}$ is hydrogen or alkyl having from 1 to 8 carbon atoms.

Examples are, in particular, N-methylol-acrylamide and -methacrylamide, the ethers derived therefrom, hydroxyalkyl methacrylate and acrylate esters, and the hydroxyalkylamides of acrylic acid and methacrylic acid, especially the hydroxyethyl and hydroxypropyl compounds.

A prerequisite to the occurrence of effective crosslinking in this case is the presence of at least two reactive "partners", within different chains of the copolymer, that will react by a condensation or addition reaction at temperatures ranging from 60° C. to about 200° C.

In addition to these reagent partners, the presence of a multifunctional crosslinking agent, which itself is not susceptible of free-radical polymerization but will react with these partner reagents above 60° C., may be required.

Such multifunctional, non-radically crosslinking agents are known per se. They must contain at least two functional groups, for example hydroxyl, epoxy, or blocked isocyanate groups, which are bound to a spacing unit, usually a hydrocarbon chain. The latter may contain from 2 to 1000, and preferably from 2 to 20, carbon atoms, with a minimum of two functional groups and a maximum of functional groups equal to the number of carbon atoms in the chain. A portion of the $-CH_2-$ units in the carbon chain may be replaced by other groups which are inert under the reaction conditions, for example by ether bridges. In general, the reagent molecules which are able to engage in such non-radical crosslinking will be present in a molar ratio of 20:1 to 1:1 with respect to the polymer to be crosslinked therewith.

Multifunctional non-radically crosslinking agents having at least two isocyanate groups in the molecule are preferably employed in the form of "blocked" or "masked" isocyanate compounds. Such blocking includes, for example, the reaction of isocyanate-polysubstituted compounds (diisocyanates) with polyols. An example is the reaction product of 2,4- or 2,6-toluylene diisocyanate with a polyol, for example the compound $CH_3CH_2C(CH_2OH)_3$, which reacts with phenol to yield phenyl urethane. Such "blocked" isocyanates" are commercially available, for example, under the trademark "DESMODUR AP" of Bayer AG. Polyepoxy compounds suitable for use in crosslinking the polymers include those formed by the reaction of bisphenol A with epichlorohydrin, for example "EPIKOTE 1001", a product of Shell Chemie having a molecular weight of 900.

As mentioned above, the condensation or addition reactions resulting in crosslinking include reactions between the following functional groups:

| | In the monomer | | In the multifunctional non-radically crosslinking agent |
|---|---|---|---|
| (i) | $-COOR$ <br> R = alkyl | (vii) | $HO-CH_2-NH-\overset{\overset{O}{\|\|}}{C}-$ |
| (ii) | $-COOH$ | (viii) | $HO-CH_2-$ |
| (iii) | $-CH_2OH$ | (ix) | $H_2C\overset{\diagdown}{\underset{O}{\phantom{x}}}\overset{H}{\underset{\diagup}{C}}-$ |
| (iv) | $\overset{O}{\underset{\|\|}{-C}}-NH-CH_2OH$ | (x) | blocked isocyanate |

|  | In the monomer | In the multifunctional non-radically crosslinking agent |
|---|---|---|
| (v) | $-\overset{\overset{\text{O}}{\|}}{\text{C}}-\text{NH}_2$ | |
| (vi) | $-\overset{\overset{\text{H}}{\|}}{\underset{\text{O}}{\text{C}}}\diagdown\text{CH}_2$ | |

The principal modes of reaction are likely to include reaction of:

(i) with (iii), (iv), (vii), (viii) or (ix); (ii) with (iii), (iv), (vi), (vii), (ix) or (x); (iv) with (v), (vii), (viii), (ix) or (x); and (v) with (v).

Also preferred is an embodiment in which component (B) is formed in whole or in part of styrene and/or its derivatives according to (d).

As a rule, the molecular weights of the copolymers to be used in accordance with the invention will range from $5 \times 10^4$ to $2 \times 10^6$, and more particularly from $2 \times 10^5$ to $1 \times 10^6$ as determined by gel permeation chromatography (cf. Dawkins, *Gel Permeation Chromatography of Polymers*, Elsevier, Amsterdam, 1978).

In a further advantageous embodiment of the invention, the binder in the aqueous dispersion may contain, in addition to the copolymer, from 1 to 10 percent, by weight of the copolymer, of a radically crosslinking monomer having a boiling point above 150° C., together with an initiator which is soluble in the crosslinking monomer and has a decomposition temperature of over 100° C., in amounts of from 0.1 to 5 percent by weight of the monomer. Such radically crosslinking monomers are known compounds having more than one radically polymerizing double bond in the molecule, for example the esters formed between acrylic acid and methacrylic acid and polyols.

PREPARATION OF DISPERSIONS

Aqueous dispersions of such copolymers may be prepared by conventional methods, particularly by emulsion polymerization as described in U.S. Pat. No. 4,585,809, incorporated herein by reference. Either the emulsion-addition or the monomer-addition method may be employed, the initial charge consisting of a portion of the water and of either the total amount or portions of the initiator and of the emulsifier. In this process, particle size can be controlled to advantage by the amount of emulsifier present in the initial charge. Suitable emulsifiers are, in particular, anionic and non-ionic surfactants. As a rule, the amount of emulsifier used should not exceed 3 percent by weight of the polymer.

In addition to the compounds commonly used in emulsion polymerization, for example peroxy compounds such as hydrogen peroxide or ammonium persulfate, suitable initiators are redox systems such as bisulfite/ammonium persulfite/iron, as well as azo initiators. The amount of initiator will usually range from 0.005 to 0.5 percent by weight of the polymer. (See H. Rauch-Puntigam & T. Volker, "*Acryl- und Methacrylverbindungen*", Springer-Verlag, 1967, pp. 217-299).

To some extent, the polymerization temperature depends on the initiator. For example, when ammonium persulfate is used, polymerization is advantageously carried out in the 60° C. to 90° C. range. With redox systems, lower temperatures, for example 30° C., may be used.

As well as the addition method of polymerization, the batch method may be employed. The initial charge then consists of the total amount, or of a portion of, the monomers with all auxiliary substances and polymerization is initiated by means of a redox system. The monomer/water ratio should then be based on the reaction heat being liberated. No difficulties will generally be encountered if a 50 percent emulsion is prepared by first emulsifying half of the monomers and half of the auxiliary substance in the total amount of the water, then initiating polymerization at room temperature, cooling the batch after reaction has set in, and adding the other half of the monomers and of the auxiliary substances.

The diameter of particles in the dispersions used in accordance with the invention will usually range from 0.05 to 5 microns, and preferably from 0.1 to 1 micron, and more particularly from 0.1 to 0.5 micron.

PREPARATION OF MOLDING SANDS CONTAINING A BINDER FROM DRY MOLDING SAND

Ready-to-use molding sands (which contain a binder and at most contain mechanically held moisture) are prepared by mixing the dried emulsion polymers in the amounts specified with molding sands, preferably gradually, using mixing methods and devices suited for use with solids (see Ullmann's *Enzyklopadie der technischen Chemie*, 4th Ed., Vol. 2, pp. 301-311; Verlag Chemie, 1972), for example rotary mixers. Care should be taken to secure homogeneous dispersion. If desired, further commonly used and compatible additives, for example dressings such as graphite and the like, may be added to the molding sands. Optionally, multifunctional nonradically crosslinking agents may also be admixed at this time.

The resulting ready-to-use compositions (to which no water has been added so far) are easy to handle, free flowing materials which fully meet requirements on storage stability and transportability.

Moreover, it is possible, though not preferred, to add the emulsion polymer to the sand in its acidic, unneutralized, form and only thereafter to mix the necessary base into the binder-containing molding sands with water. Proceeding in reverse, in other words wetting the sand first and then admixing the polymer powder with it, also appears feasible. However, admixing the latter as an aqueous dispersion is not consistent with the teaching of the present invention.

USE OF MOLDING SANDS CONTAINING A BINDER

First water is added to the binder-containing molding sand in the ratio given above (based on the polymer powder). A good rule of thumb is that with 1 percent by weight of polymeric binder, for example about 2.5 +1 percent by weight of water should be added to the sand.

The water is best added to the molding sand by spraying it onto the sand while the latter is advantageously kept in motion, that is agitated. The addition of the water is preferably carried out in such a way that the water is distributed uniformly from the start. This also determines the rate of addition. A period of five minutes will serve as a guide. It is advisable to keep the material in motion, that is agitated, until thorough mixing and homogeneous dispersion are assured.

The moist molding sand so prepared is free flowing and can be used directly, for example to produce foundry mold cores, for instance using a core blower.

PREPARATION OF BINDER-CONTAINING MOLDIND SANDS FROM WETTED MOLDING SAND 2000 g of dried molding sand (H32, a product of Quarzwerke Cologne, Haltern quarry) is wetted with agitation by spraying with 73 g of water in such a way that uniform wetting is obtained. Then 40 g of polymer powder are added with good mechanical mixing in an agitator.

A moist, free flowing, slightly tacky molding sand is obtained. Good test pieces which are technically flawless can be produced with the molding sand so prepared.

If, however, more than 5 percent by weight of water is mixed into the sand, the latter becomes mushy and unfit for use upon addition of the polymer powder.

(A) Preparation of a dry binder-containing molding sand

H32 quartz sand is mulled in a forced-motion mixer run between 100 and 300 rpm and 2 weight percent of the polymer powder, prepared as in Example 1, is slowly added to it.

A material of high flowability which meets practical requirements in every respect is obtained.

(B) Use cf dry binder-containing molding sand 3.7 percent by weight of water (based on the molding sand) is sprayed over a period of five minutes onto dry molding sand containing a binder prepared as under (A).

The moist, free flowing molding sand so obtained is then blown using a core blower (Roper H 6, 5-EW/28, G 73/32).

Blowing pressure: 6 bar
Blowing time: 3 to 5 seconds
Baking time: 60 to 70 seconds
Temperature of core box: 200° C.

Cores are obtained which have a smooth, firm surface. They are coated with various dressings (alcohol/black, water/ gray) and used for casting metal. Castings which are free of flaws are so obtained.

EXAMPLE 1

Preparation of binder (A) Preparation of dispersion 12.25 g of the sodium salt of triisobutylphenol polyglycol ether sulfate (degree of ethoxylation: 7) and 49 g of ammonium persulfate are dissolved in 19600 g of desalinated water at 20° C. in a stainless steel reaction vessel having a capacity of 100 liters and equipped with reflux condenser, stirrer, and feed vessel.

An emulsion of
10500 g of methyl methacrylate,
1050 g of ethyl acrylate,
1050 g of hydroxyethyl acrylate,
2100 g of acrylic acid,
6300 g of methacrylic acid,
478 g of sodium salt of triisobutylphenol polyglycol ether sulfate (degree of ethoxylation: 7),
49 g of ammonium persulfate, and
30500 g of desalinated water is added to this solution over a period of 4 hours at 80° C., with sirring.

On completion of this addition, the batch is maintained at 80° C. for another hour and then cooled to room temperature. Then, 17150 g of a 2.5 percent of NaOH solution are added dropwise with stirring over a period of 80 minutes and the dispersion is filtered. Alternatively, an equivalent amount of ammonia as a 10 percent aqueous solution can be used for partial neutralization.

The low viscosity dispersion has a dry solids content of 25.3 percent. The particle radius, determined by photon correlation spectroscopy, is 94 nanometers, and the pH value is 5.0. The minimum film-forming temperature (MFT) is 50° C., and the glass transition temperature $T_{\lambda max}$ is 165° C.

(B) Drying of dispersion

For drying of the dispersion, spray dryer equipment having a disk atomizer rotating at high speed (20000 rpm) and operated concurrently with air at 140° C. is used. The ratio of the amount of dispersion to air is set so that the material being dried leaves the dryer at an outlet air temperature of 68° C. as a dry, finely divided, white to translucent powder containing no glassy constituents. The throughput of dry air is 400 m3/hr.

(C) Test for redispersibility 20 g of this spray dried powder is stirred into 80 g of water and homogenized for 30 minutes. The powder can be fully redispersed. The particle radius is found to be 98 nanometers.

What is claimed is:

1. A method for making a molding sand containing a polymeric binder, which method comprises uniformly admixing a molding sand free of binder with a dried emulsion polymer that is redispersible in water and comprises
   (A) from 15 to 90 percent by weight of at least one unsaturated carboxylic acid of the formula

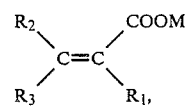

wherein $R_1$, $R_2$, and $R_3$ independently are hydrogen, alkyl having from 1 to 6 carbon atoms, or —(CH$_2$)$_n$—COOM, M is a proton or an alkali metal, alkaline earth metal, or ammonium cation, and n is 0 or 1, said unsaturated carboxylic acids having not more than two —COOM groups in the molecule, and
   (B) from 10 to 85 percent by weight of further monomers copolymerizable with (A), from 0.5 to 50 weight percent of monomer (A) being present in its salt form wherein M is an alkali metal, alkaline earth metal, or ammonium cation.

2. A method as in claim 1, wherein said polymer is admixed with said molding sand in an amount from 0.1 to 20 percent by weight of the molding sand.

3. A method as in claim 1, wherein said polymer is admixed with said molding sand in an amount from 1 to 3 percent by weight of the molding sand.

4. A method as in claim 1, wherein said molding sand is dry.

5. A method as in claim 1, wherein said molding sand is wetted.

6. A method as in claim 5, wherein said molding sand has a water content from 0.5 to 4.5 percent by weight.

* * * * *

UNITED STATES PATENT AND TRADEMARK OFFICE
CERTIFICATE OF CORRECTION

PATENT NO. : 4,847,309

DATED : July 11, 1989

INVENTOR(S) : Klesse et al.

It is certified that error appears in the above-identified patent and that said Letters Patent is hereby corrected as shown below:

Column 6, line 68, replace "$T_{80\ max}$" by -- $T_{\lambda\ max}$ --.

Column 10, line 58, replace "$2.5 + 1$" by -- $2.5 \pm 1$ --.

Signed and Sealed this

Twenty-eighth Day of August, 1990

Attest:

HARRY F. MANBECK, JR.

Attesting Officer

Commissioner of Patents and Trademarks